USOO6873807B2

United States Patent
Umetsu

(10) Patent No.: US 6,873,807 B2
(45) Date of Patent: Mar. 29, 2005

(54) IMAGE FORMING APPARATUS

(75) Inventor: Toshiyuki Umetsu, Fuji (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/391,663

(22) Filed: Mar. 20, 2003

(65) Prior Publication Data

US 2004/0184832 A1 Sep. 23, 2004

(51) Int. Cl.[7] .......................... G03G 15/00; G03G 21/02
(52) U.S. Cl. ............................................ 399/81; 399/79
(58) Field of Search .............................. 358/1.16, 1.17; 379/91.01, 100.04; 399/8, 79, 80, 81; 705/1, 30

(56) References Cited

U.S. PATENT DOCUMENTS 6,064,838 A * 5/2000 Maruta et al. ................. 399/79

FOREIGN PATENT DOCUMENTS

JP 4-79658 A 3/1992

* cited by examiner

Primary Examiner—Hoang Ngo
(74) Attorney, Agent, or Firm—Foley & Lardner LLP

(57) ABSTRACT

The present invention can print out operating instructions, HELP documents, the latest image forming apparatus information, support and maintenance information, advertisements about new models and services, and the like without incrementing a charging counter.

Without caring about the charging, users can print out operating instructions, HELP documents, the latest image forming apparatus information, support and maintenance information, advertisements about new models and services, and the like.

10 Claims, 11 Drawing Sheets

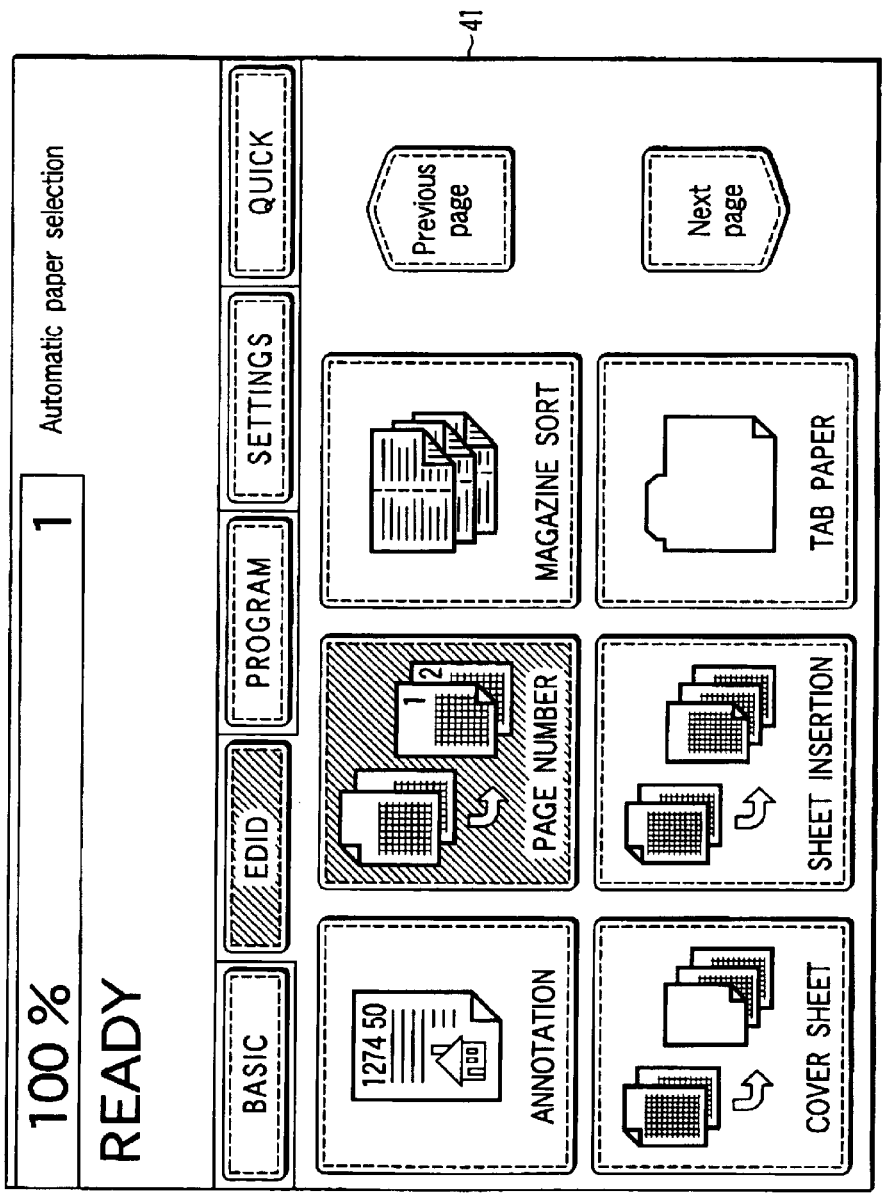
F I G. 5

IMAGE FORMING APPARATUS

BACKGROUND OF THE INVENTION

1. Field of the Invention

The present invention relates to an image forming apparatus such as a digital copier.

2. Description of the Related Art

There has been used the function of allowing a user to print descriptive text about a function he or she wants to know or a HELP document from a control panel. It has been possible to obtain various types of information such as the latest information, support and maintenance information, advertisements about new models and services, and the like via a network and print them out if needed.

The user may want to print information other than documents (hereafter referred to as user-intended documents) he or she wants to copy or print for his or her own purpose. For example, the user may want to print an instruction manual, HELP documents, the latest image forming apparatus information, support and maintenance information, advertisements about new models and services, and the like.

A counter counts printouts of even such information other than user-intended documents for charging, thus imposing a burden on users. Such a burden becomes an obstacle to a user's intention to print supplied valuable information.

There is also an obstacle to communication between the image forming apparatus' manufacturer or distributor and users.

BRIEF SUMMARY OF THE INVENTION

It is an object of the present invention to provide a more user friendly image forming apparatus capable of disabling charging for requests other than user-intended documents, eliminating the costs so far imposed on users, allowing the users to print out operating instructions, HELP documents, the latest image forming apparatus information, support and maintenance information, advertisements about new models and services, and the like without caring about the charging, and providing the users with more knowledge about the image forming apparatus.

The image forming apparatus according to the present invention recognizes such documents other than normal documents, i.e., user-intended documents as operating instructions, HELP documents, the latest information about the image forming apparatus, support and maintenance information, advertisements about new models and services, and the like, and prevents a charging counter from counting printouts of such documents other than the user-intended documents.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5 through 8 show display examples of the liquid crystal display section;

DETAILED DESCRIPTION OF THE INVENTION

With reference to the accompanying drawings, the following describes an image forming apparatus such as a digital color copier according to an embodiment of the present invention.

Figure 1:
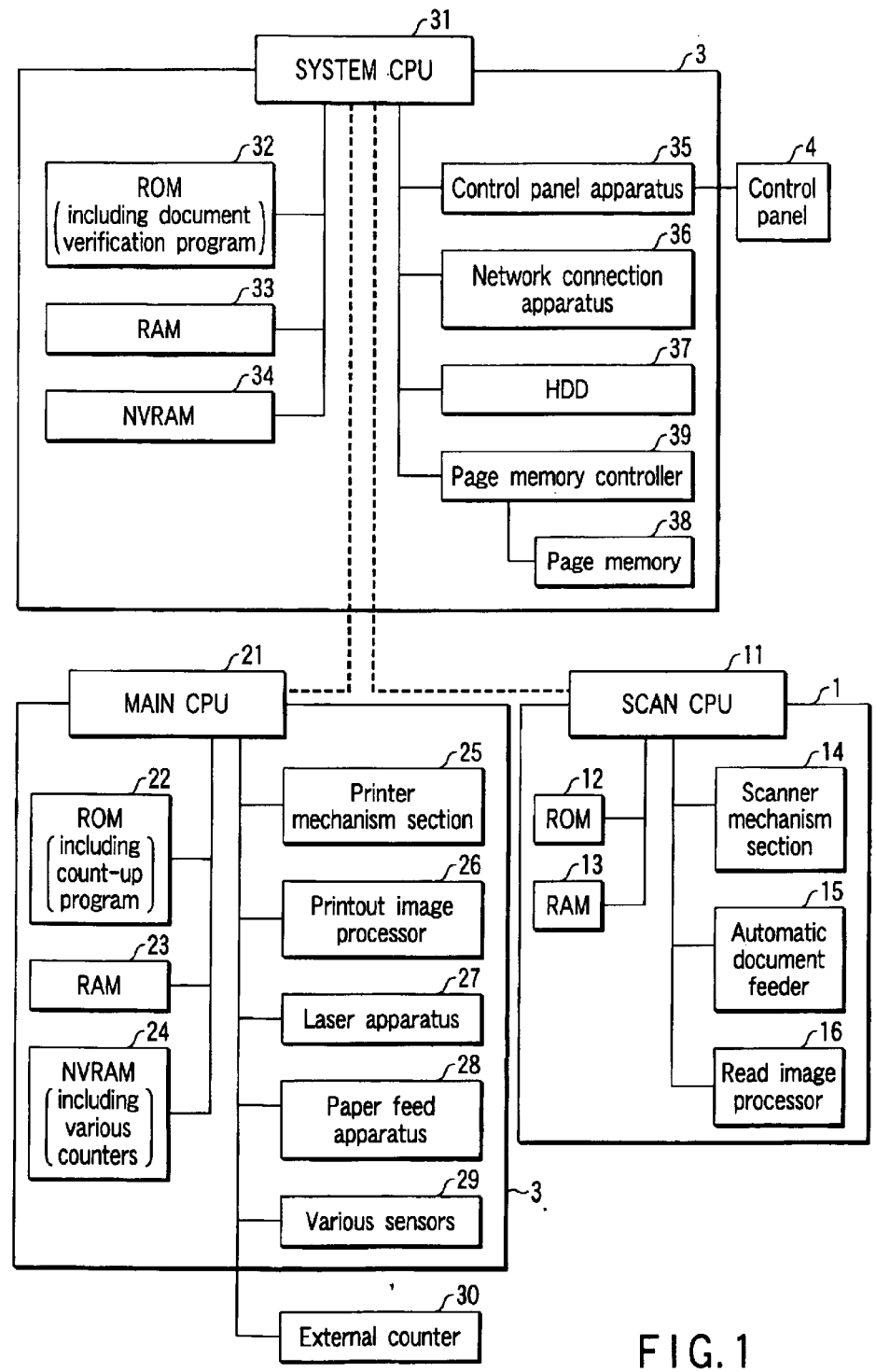
FIG. 1 is a block diagram showing a schematic configuration of a digital copier for explaining an embodiment of the present invention.

FIG. 1 schematically shows an internal configuration block of the image forming apparatus according to the present invention such as a digital color copier that reads a color image from a document and forms its duplicate image. The image forming apparatus broadly comprises a color scanner section 1 as an image read means for reading and inputting a color image on a document; a color printer section 2 as an image forming means for forming a duplicate image of the input color image; a control section 3 to control the entire image forming apparatus; and a control panel 4.

The scanner section 1 comprises a scanner CPU 11 to control the entire operation; a ROM 12 to store a control program and the like; a RAM 13 to store data; a scanner mechanism section 14; an automatic document feeder 15; and a read image processor 16.

The scanner mechanism section 14 comprises an optical system to read and scan documents; a carriage mechanism to move the optical system along a document table; a color image sensor to convert a document image supplied by the optical system into image signals corresponding to respective colors; an image correction section to correct image signals output from the color image sensor, and the like.

The color printer section 2 comprises a main CPU 21 to control the entire operation; a ROM 22 to store a control program, a count-up program, and the like; a RAM 23 to store data; an NVRAM (nonvolatile random access memory) 24 to contain various counters; a printer mechanism section 25; a printout image processor 26; a laser apparatus 27; a paper feed apparatus 28; and various sensors 29. The main CPU 21 connects with an external counter 30 for accounting.

The printer mechanism section 25 comprises printers that perform printing based on image data for corresponding colors (Y, M, C, BK) separated by the printout image processor 26. Each printer comprises a photoconductor drum as an image carrier; a charging apparatus to charge the surface of the photoconductor drum; an exposing apparatus having a semiconductor laser oscillator (laser apparatus 27) controlled for light generation based on imaged data corresponding to the respective separated colors (Y, M, C, BK) and forming an electrostatic latent image on the photoconductor drum; a developing apparatus to develop the electrostatic latent image using a toner image on the photoconductor drum; a transport mechanism to carry paper as an image forming medium; a transfer apparatus to transfer a toner image on the photoconductor drum to the paper carried by the transport mechanism; and a fixing apparatus to fix the toner image transferred to the paper by the transfer apparatus.

The control section 3 comprises a system CPU 31 responsible for the overall control; a ROM (read-only memory) 32 to store a control program, a document verification program, and the like; a RAM 33 to store data; an NVRAM (nonvolatile random access memory or nonvolatile RAM) 34 as battery-backed nonvolatile memory; a control panel apparatus 35 to control the control panel 4; a network connection apparatus 36; an HDD 37; and a page memory controller 39 to store and read a page memory 38.

Figure 2:
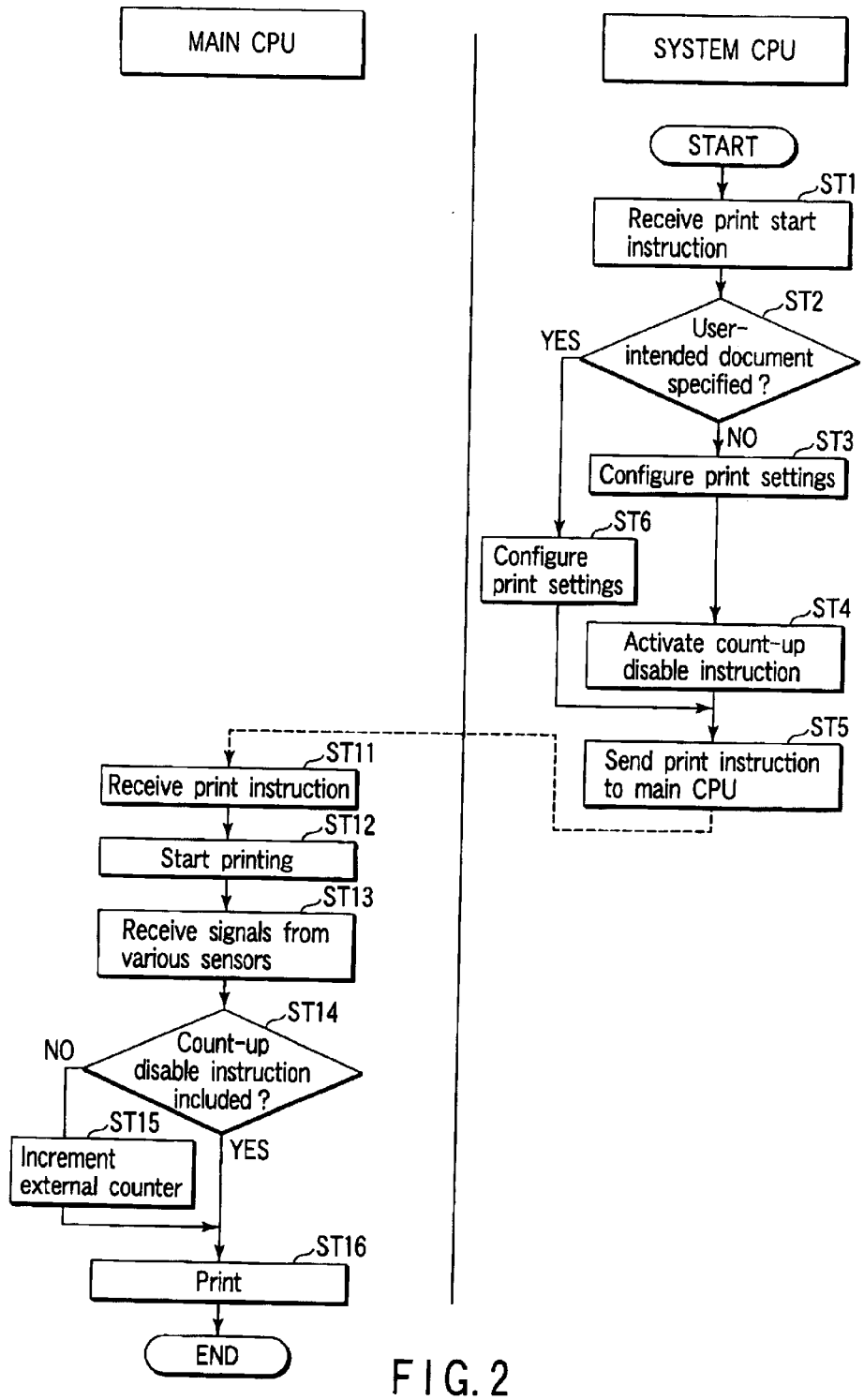
FIG. 2 is a flowchart showing control of an accounting counter.

The control panel 4 is used for various settings. As shown in FIG. 2, for example, the control panel 4 comprises a screen display (liquid crystal display) 41 including a touch panel for displaying and entering the contents of settings and operations; and an input apparatus 42 comprising a simple keyboard including a numeric keypad and, alphabetic keys, and the like. Further, the control panel 4 is provided with a help key 43 used for guidance about unknown functions; and a network key 44 used for sending printout contents to an external device via a network.

A touch key operation on the liquid crystal display section 41 enables a basic (BASIC) mode, application (EDID) mode, special (PROGRAM) mode, confirmation (SETTINGS) mode, or simple (QUICK) mode. In addition, the liquid crystal display section 41 can be used for other settings, such as specifying the number of copies.

The EDID mode further enables ANNOTATION for supplying date and time, PAGE NUMBER for page numbering, MAGAZINE SORT, COVER SHEET mode, SHEET INSERTION mode, and TAB PAPER mode.

Figure 3:
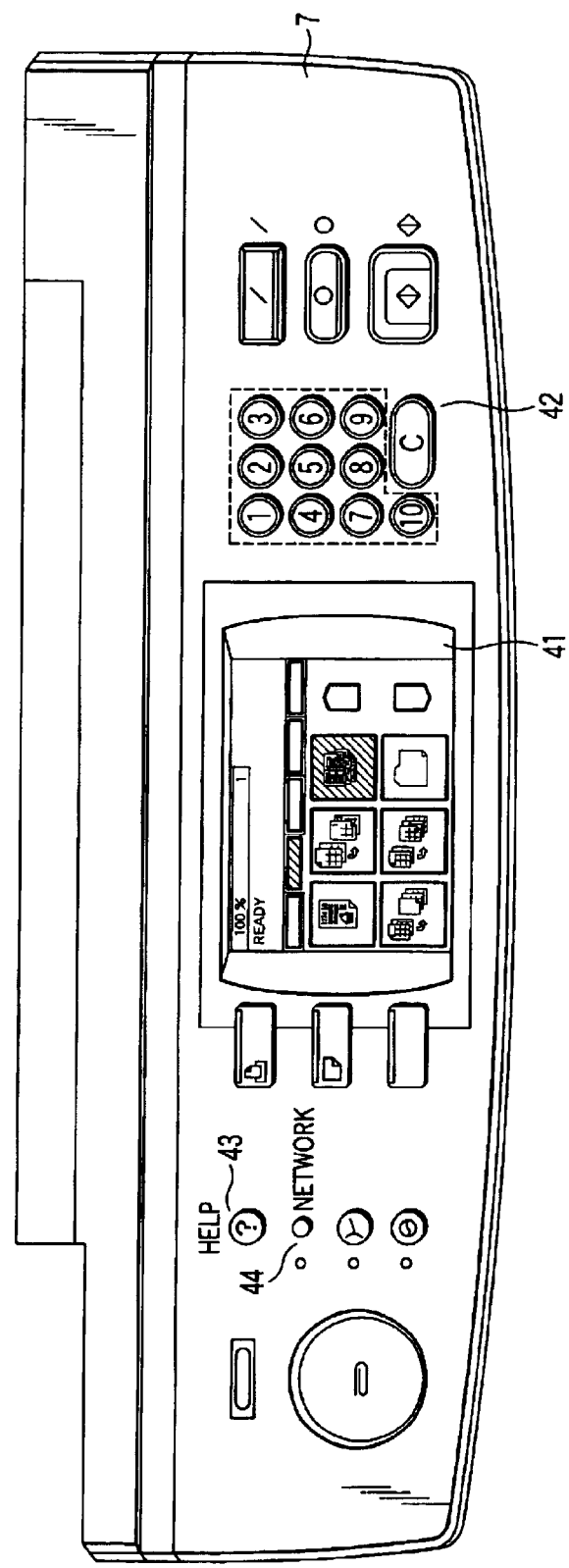
FIG. 3 shows a schematic configuration of a control panel.

In the above-mentioned configuration, a count process performed by the accounting counter 30 will now be described with reference to the flowchart in FIG. 3.

When receiving a print start instruction (ST1), the system CPU 31 uses the "document verification program" to determine whether or not a user-intended document is specified (ST2).

If the determination result shows that the user-intended document is specified, the system CPU 31 configures print settings such as a paper size, resolution, and the like (ST6), and then sends a print instruction to the main CPU 21 (ST5).

If the determination result at step 2 shows that no user-intended document is specified, the system CPU 31 configures print settings (ST3), activates a count-up disable instruction (ST4), and then sends a print instruction to the main CPU 21 (ST5).

The main CPU 21 receives the print instruction (ST11) and starts printing (ST12). When the printing starts, the main CPU 21 uses various sensor signals (ST13) to measure a count-up timing. Then, the main CPU 21 determines whether or not the print instruction contains the count-up disable instruction (ST14).

If the determination result shows no count-up disable instruction, the main CPU 21 starts the count-up program, increments an external counter 17 (ST15), and then executes the print process (ST16).

If the determination result at step 14 shows that the count-up disable instruction is available, the main CPU 21 executes the print process without starting the count-up program, i.e., without incrementing the external counter 17 (ST16).

Figure 4:
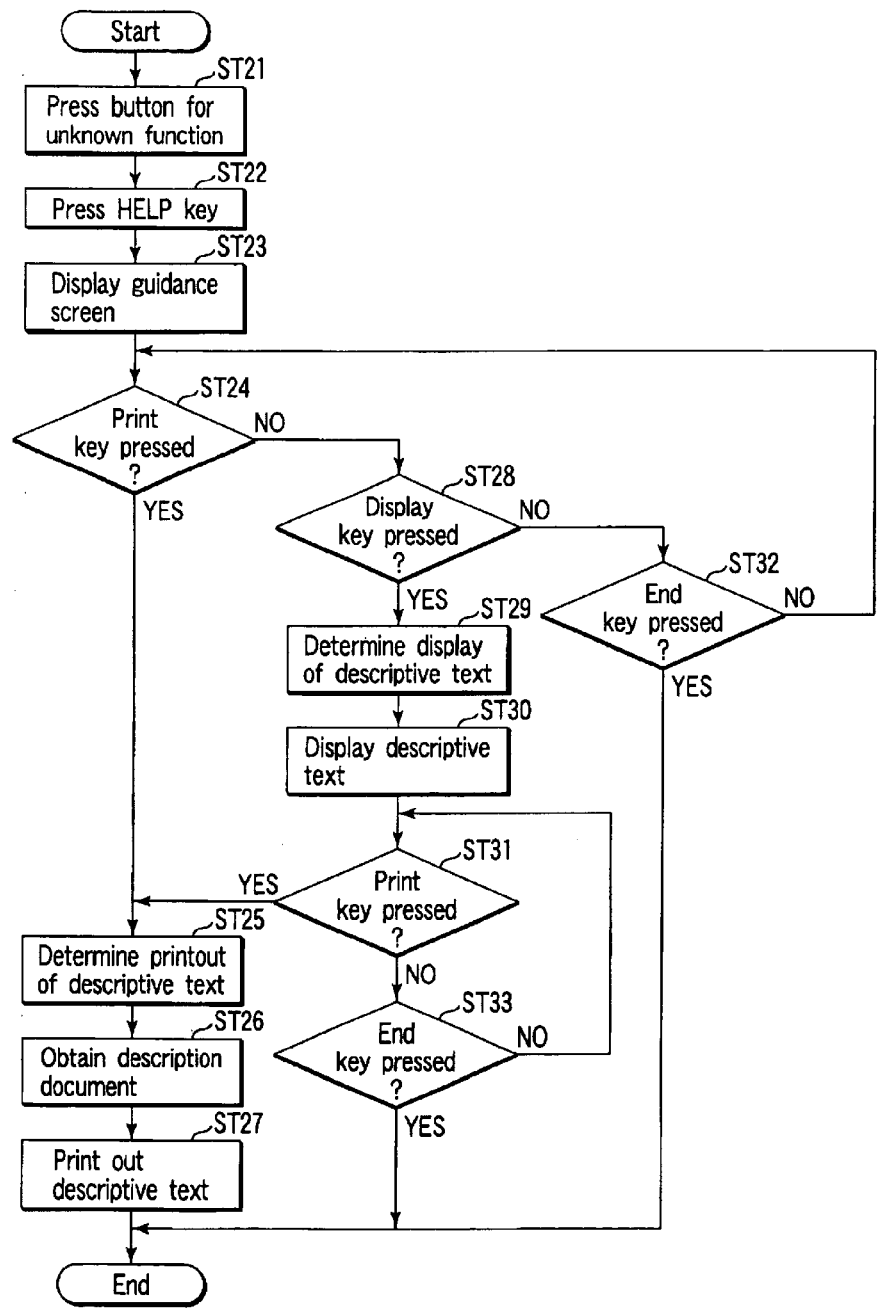
FIG. 4 is a flowchart describing a process of printing function description for a liquid crystal display section.
Figure 7:
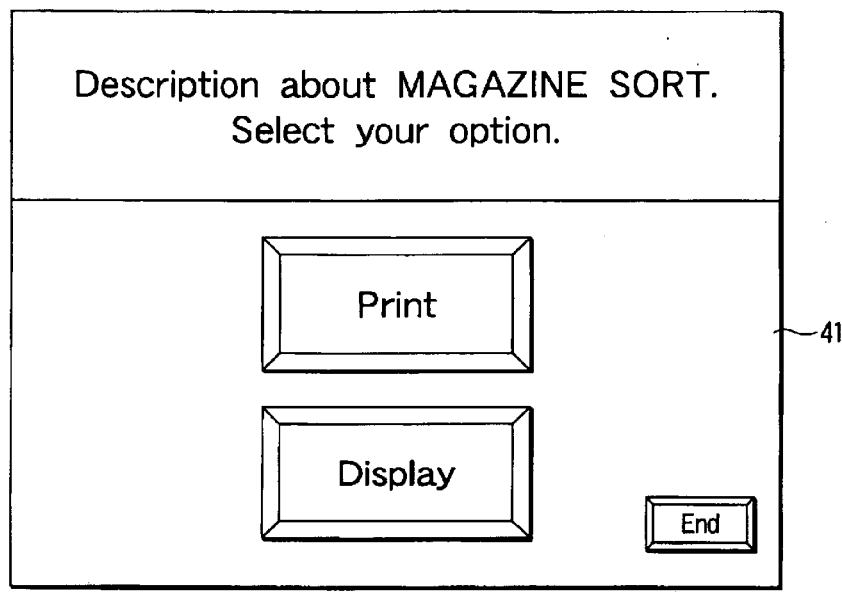
Figure 8:
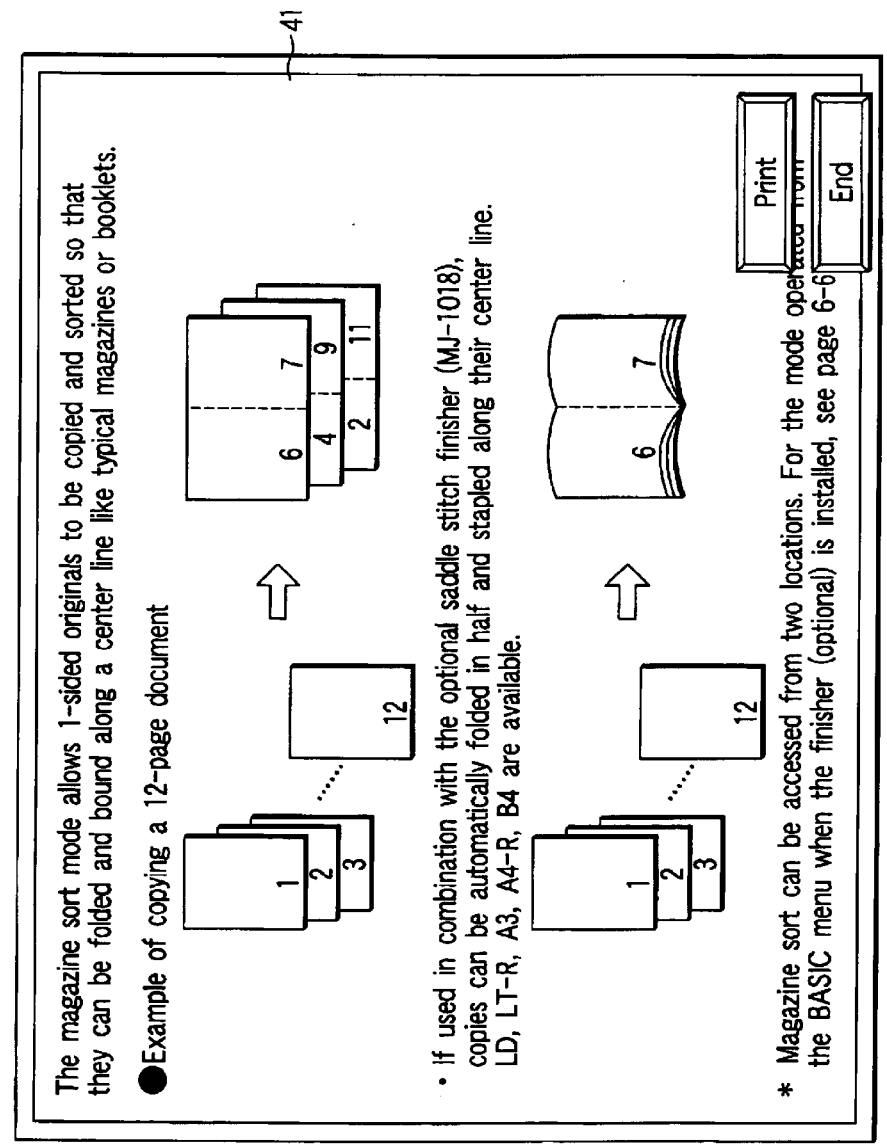
Figure 9:
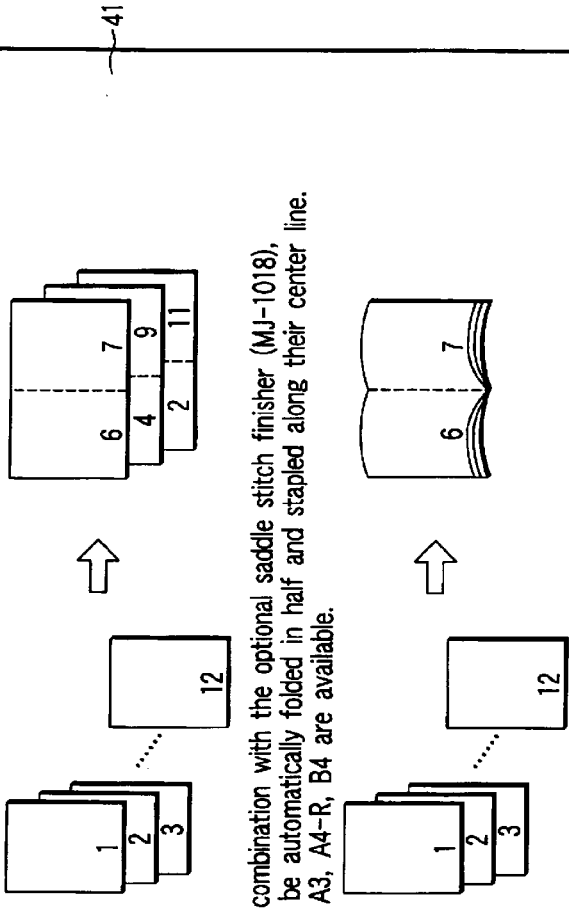
FIG. 9 illustrates a printout result.

The following describes a process to print out descriptive text explaining unknown functions using the liquid crystal display section 42 of the control panel 4 with reference to a flowchart in FIG. 4, display examples in FIGS. 5 through 8, and a printout example in FIG. 9.

Figure 6:
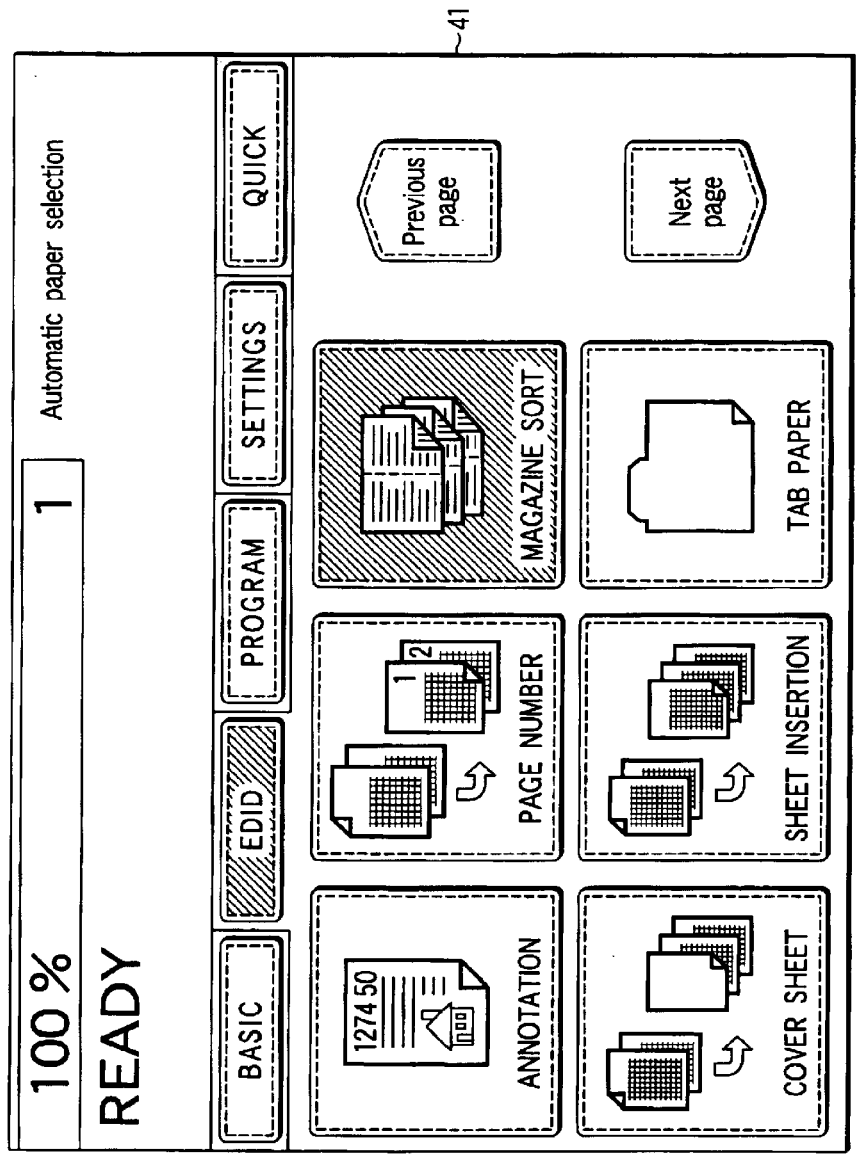

Now, let us suppose that a user is unfamiliar with the function of the MAGAZINE SORT button during a touch panel operation on the liquid crystal display section 42. The user presses that button for the unknown function to select it (ST21), and then presses the HELP key 43 (ST22). That is to say, the user presses the HELP key 43 with the PAGE NUMBER function selected in the EDID mode as shown in FIG. 5. Alternatively, the user presses the HELP key 43 with the MAGAZINE SORT function selected in the EDID mode as shown in FIG. 6.

In response to this, the system CPU 31 uses the liquid crystal display section 42 to display a guidance screen as shown in FIG. 7 (ST23). The guidance screen prompts the user to determine whether to display or print the descriptive text of the selected function. The guidance screen comprises the text such as "Description about . . . Select your option", and keys such as "Print", "Display", and "End".

When the user presses "Print" (ST24) in accordance with the guidance screen, the system CPU 31 determines the printout of the descriptive text about the corresponding function and the paper size used for the printout (ST25), reads (obtains a description document) from the HDD 37 based on the paper size, and outputs the document to the color printer section 2 (ST26). In this manner, the color printer section 2 prints out the descriptive text as shown in FIG. 9 (ST27). During this printout, the accounting counter 30 is configured not to be incremented.

When the user presses "Display" on the guidance screen (ST28), the system CPU 31 determines the display of the descriptive text about the corresponding function (ST29), reads (obtains a description document) from the HDD 37, and outputs the document to the liquid crystal display section 42 (ST30). In this manner, the liquid crystal display section 42 displays the descriptive text as shown in FIG. 8.

In this case, the liquid crystal display section 42 displays the keys "Print" and "End" as well as the descriptive text.

When the user presses the "Print" key (ST31) in response to the displayed descriptive text, the system CPU 31 determines the printout of the descriptive text about the corresponding function (ST25), reads and obtains a description document from the HDD 37 based on the paper size, and outputs the document to the color printer section 2 (ST26). In this manner, the color printer section 2 prints out the descriptive text as shown in FIG. 9 (ST27). During this printout, the accounting counter 30 is configured not to be incremented.

When the user presses the "End" key (ST32, 33) in response to the displayed contents or descriptive text on the guidance screen, the system CPU 31 disables the help state for the corresponding function and returns to the display state for the initial function selection at step 21.

When the print, display, and end keys are selected, it may be preferable to long or repeatedly press the corresponding key. While the description document is retrieved from the HDD 37 in the above-mentioned example, it may be also preferable to retrieve the document from an external device via the network.

The image forming apparatus can obtain various types of information such as the latest information, support and maintenance information, advertisements about new models and services, and the like via the network. Such information can be confirmed by pressing the network key 44 on the control panel 4.

Figure 11:
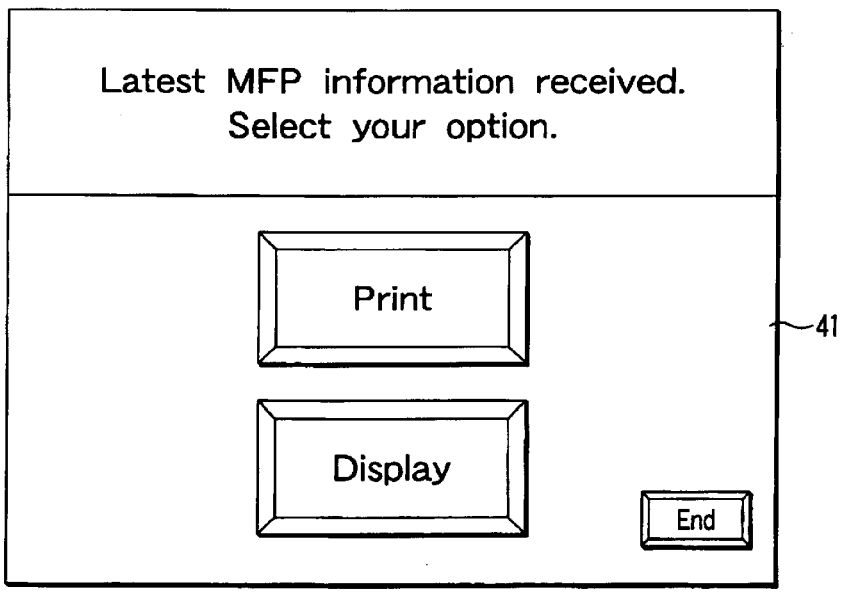
FIGS. 11 and 12 show display examples of the liquid crystal display section.
Figure 10:
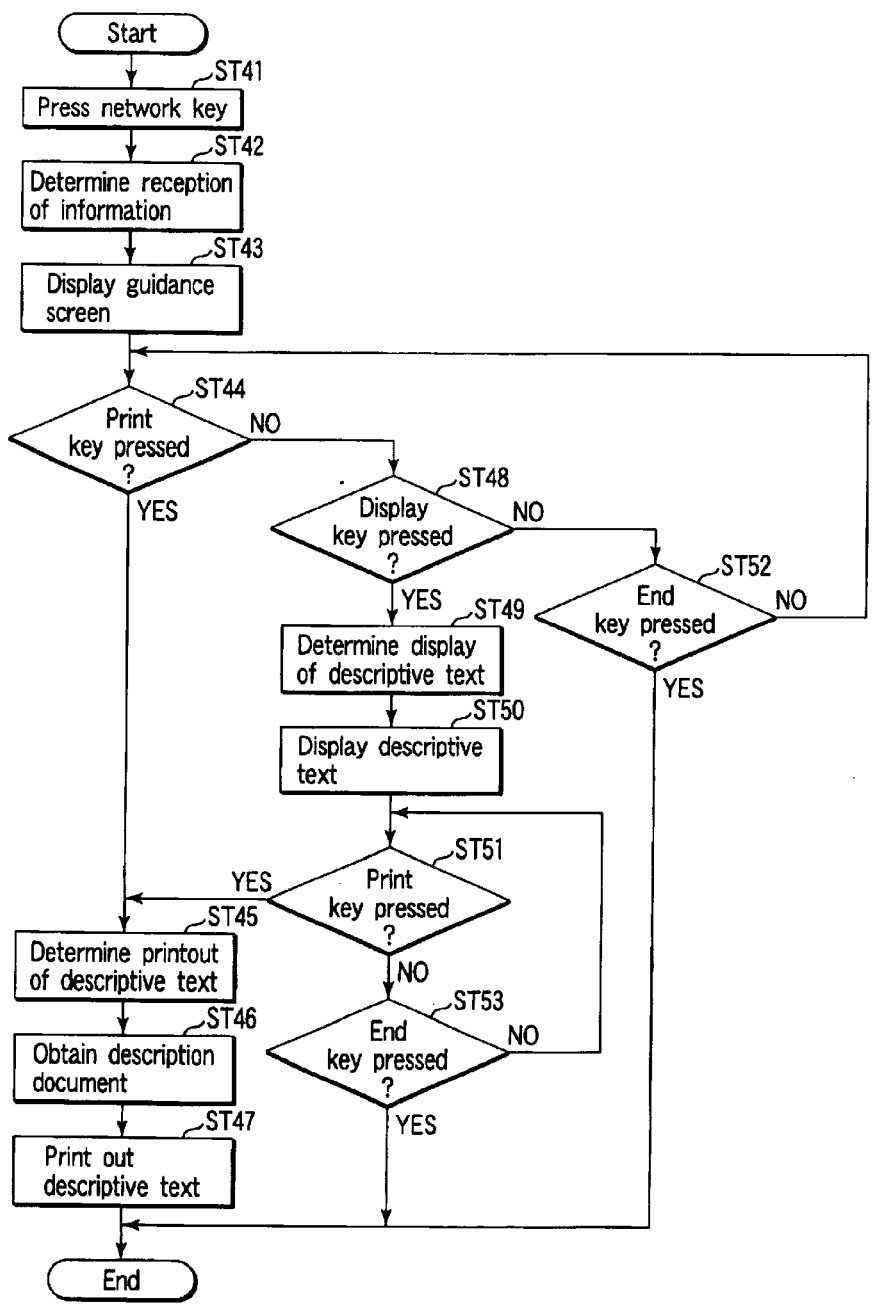
FIG. 10 is a flowchart describing a process of printing latest image forming apparatus information.
Figure 12:
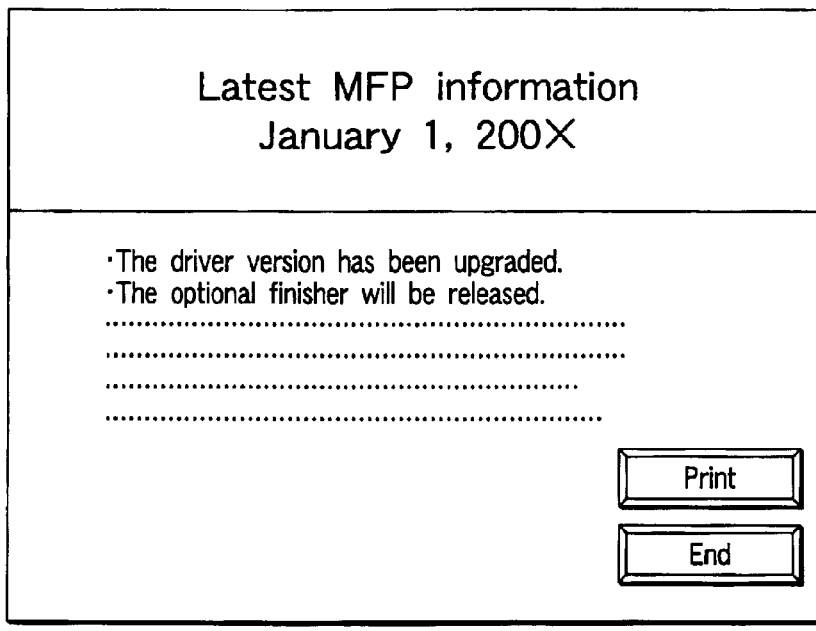
Figure 13:
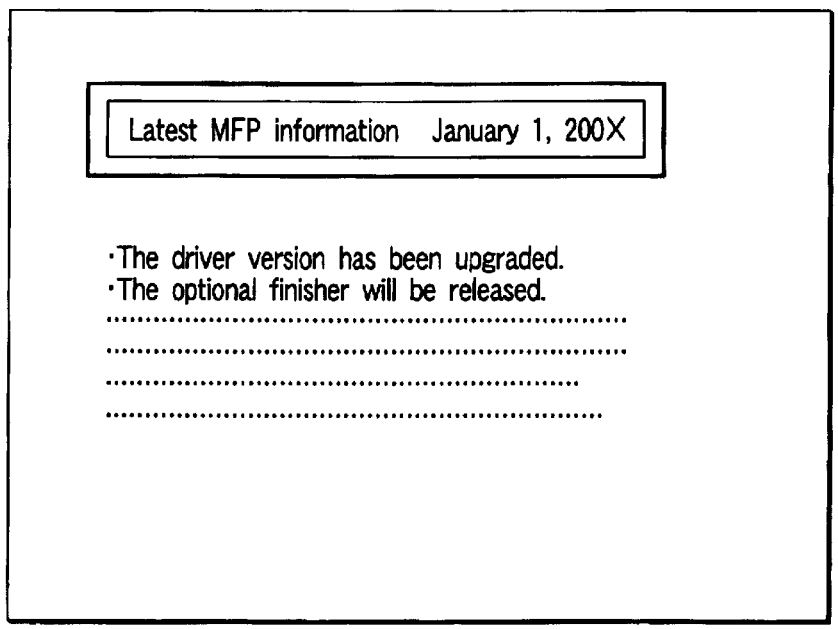
FIG. 13 illustrates a printout result.

This process will be described with reference to a flowchart in FIG. 10, display examples in FIGS. 11 and 12, and a printout example in FIG. 13.

For example, the user now presses the network key 44 on the liquid crystal display section 42 (ST41). In response to this, the system CPU 31 checks if latest image forming apparatus information is received (e.g., stored in the HDD 37) from an external device via the network connection apparatus 36 (ST42). If such information is received, the system CPU 31 allows the liquid crystal display section 42 to display the guidance screen as shown in FIG. 11 (ST43). The guidance screen comprises text such as "Latest image forming apparatus information received. Select your option", and keys such as "Print", "Display", and "End".

When the user presses the "Print" key (ST44) in response to the guidance screen, the system CPU 31 determines the printout of the latest image forming apparatus information and the paper size used for the printout (ST45), reads the information from the HDD 37 based on the paper size, and outputs the information to the color printer section 2 (ST46). In this manner, the color printer section 2 prints out the latest image forming apparatus information as shown in FIG. 13 (ST47). During this printout, the accounting counter 30 is configured not to be incremented.

When the user presses "Display" on the guidance screen (ST48), the system CPU 31 determines the display of the latest image forming apparatus information (ST49), reads (obtains the latest image forming apparatus information) from the HDD 37, and outputs the information to the liquid crystal display section 42 (ST50). In this manner, the liquid crystal display section 42 displays the latest image forming apparatus information, as shown in FIG. 11.

In this case, the liquid crystal display section 42 displays the keys "Print" and "End" as well as the descriptive text.

When the user presses the "Print" key (ST51) in response to the displayed descriptive text, the system CPU 31 determines the printout of the corresponding latest image forming apparatus information (ST45), obtains the latest image forming apparatus information read from the HDD 37 based on the paper size, and outputs the information to the color printer section 2 (ST46). In this manner, the color printer section 2 prints out the latest image forming apparatus information as shown in FIG. 12 (ST47). During this printout, the accounting counter 30 is configured not to be incremented.

When the user presses the "End" key (ST52, 53) in response to the displayed contents or the latest image forming apparatus information displayed on the guidance screen, the system CPU 31 returns to the initial display state.

As mentioned above, the information provided by a manufacturer or a distributor is more easily made available, ensuring a better communication with customers. Further, it is possible to acquire more knowledge about the image forming apparatus, making the image forming apparatus user friendly.

It is possible to disable the charging for requests other than user-intended documents, eliminating the costs so far imposed on users. Without caring about the charging, the users can print out operating instructions, HELP documents, the latest image forming apparatus information, support and maintenance information, advertisements about new models and services, and the like. Further, it is possible to allow the users to have more knowledge about the image forming apparatus, making the image forming apparatus user friendly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus to form an image on an image forming medium by concurrently incrementing a charging counter, comprising:

a receiving section to receive information supplied from an external device via a network;

an instruction section to instruct output of the information supplied from the external device via the network; and process means for responding to an instruction from the instruction section and forming an image on the image forming medium according to the information received from the receiving section without incrementing the charging counter.

2. The image forming apparatus according to claim 1, wherein the information supplied from the external device via the network includes the latest information, support and maintenance information, advertisements about new models and services, and the like.

3. The image forming apparatus according to claim 1, wherein the image forming performs color printing.

4. The image forming apparatus according to claim 1, wherein the forming of the image on the image forming medium performs printing on a sheet.

5. The image forming apparatus according to claim 1, further comprising a display, wherein the printing on the sheet is performed by the process means or an image is displayed by the display.

6. The image forming apparatus according to claim 5, wherein the display is a liquid-crystal display.

7. The image forming apparatus according to claim 1, wherein instruction by the instruction section is performed by operating keys.

8. The image forming apparatus according to claim 1, wherein the receiving section comprises a determining section which determines whether the receiving section has received latest image forming apparatus information.

9. The image forming apparatus according to claim 1, wherein the receiving section comprises a determining section which determines whether the receiving section receives latest image forming apparatus information and a guidance display which displays a guidance text when the determining section judges that the latest image forming apparatus information has been received.

10. The image forming apparatus to claim 9, wherein the guidance display displays a guidance text, and also displays a key which instructs printing and a key which instructs displaying.

* * * * *